US012317109B2

(12) United States Patent
Kotaru et al.

(10) Patent No.: US 12,317,109 B2
(45) Date of Patent: May 27, 2025

(54) CALCULATING AND EXPOSING NETWORK CAPACITY AND CONGESTION TO APPLICATIONS

(71) Applicant: Microsoft Technology Licensing, LLC, Redmond, WA (US)

(72) Inventors: Manikanta Kotaru, Kenmore, WA (US); Paramvir Bahl, Bellevue, WA (US); Arjun Varman Balasingam, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 17/841,445

(22) Filed: Jun. 15, 2022

(65) Prior Publication Data

US 2023/0413076 A1 Dec. 21, 2023

(51) Int. Cl.
*H04W 24/08* (2009.01)
*H04B 17/336* (2015.01)
(Continued)

(52) U.S. Cl.
CPC .......... *H04W 24/08* (2013.01); *H04B 17/336* (2015.01); *H04B 17/3913* (2015.01); *H04L 43/0888* (2013.01)

(58) Field of Classification Search
CPC . H04W 24/08; H04B 17/336; H04B 17/3913; H04L 43/0888
See application file for complete search history.

(56) References Cited

U.S. PATENT DOCUMENTS

| 9,775,099 B2 * | 9/2017 | Laselva ................. H04W 48/18 |
| 2008/0192711 A1 * | 8/2008 | Balachandran ....... H04L 47/263 370/338 |

(Continued)

FOREIGN PATENT DOCUMENTS

WO  WO-2015193727 A1 * 12/2015 ............ H04W 4/021

OTHER PUBLICATIONS

Zhu et al. Energy-Efficient and QoS Guaranteed BBU Aggregation in CRAN Based on Heuristic-Assisted Deep Reinforcement Learning, Feb. 1, 2022, IEEE, Journal of Lightwave Technology, vol. 40, No. 3, pp. 575-587. (Year: 2022).*

(Continued)

*Primary Examiner* — Nicholas Sloms
(74) *Attorney, Agent, or Firm* — ArentFox Schiff LLP

(57) ABSTRACT

Described are examples for calculating and exposing network capacity and congestion to applications. A network entity such as a radio access network (RAN) intelligent controller (RIC) or virtual base station component receives measurements of a signal quality for a plurality of user devices connected to a RAN. The network entity estimates a deliverable throughput of a wireless link for a user device of the plurality of user devices based on at least the measurements. The network entity can consider other factors such as a number of competing users, queue sizes of the user device and of the competing users, or a scheduling policy. The network entity provides the deliverable throughput to an application server for an application of the user device communicating with the application server via the RAN. The application server can adapt a data rate for the application and the user device based on the deliverable throughput.

17 Claims, 7 Drawing Sheets

(51) Int. Cl.
*H04B 17/391* (2015.01)
*H04L 43/0888* (2022.01)

(56) References Cited

U.S. PATENT DOCUMENTS

| | | | |
|---|---|---|---|
| 2017/0317894 A1* | 11/2017 | Dao | H04L 41/5009 |
| 2020/0275304 A1* | 8/2020 | Zhao | H04W 28/12 |
| 2022/0014963 A1 | 1/2022 | Yeh et al. | |
| 2022/0116334 A1 | 4/2022 | Zhu et al. | |
| 2022/0124043 A1 | 4/2022 | Zhu et al. | |
| 2022/0413943 A1* | 12/2022 | Poornachandran | G06F 9/5027 |
| 2023/0247476 A1* | 8/2023 | Chun | H04L 65/1073 |
| | | | 370/235 |

OTHER PUBLICATIONS

Raca et al., Mar. 2020, "On leveraging machine and deep learning for throughput prediction in cellular network: design, performance, and challenges." Mar. 2020, IEEE, IEEE Communications Magazine pp. 11-17 (Year: 2020).*

"3rd Generation Partnership Project; Technical Specification Group Radio Access Network; NR; Study on test methods", In 3GPP TR 38.810 V16.6.1—Technical Report, Sep. 2020, 171 Pages.

"International Search Report and Written Opinion Issued in PCT Application No. PCT/US2023/019541", Mailed Date: Jul. 3, 2023, 12 Pages.

* cited by examiner

CALCULATING AND EXPOSING NETWORK CAPACITY AND CONGESTION TO APPLICATIONS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize one or more data centers with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various radio units (RU) can be deployed at edge servers with connections to antennas. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the data centers utilize generic computing resources, a virtualized RAN may provide scalability and fault tolerance for base station processing. For example, the data centers may assign a variable number of computing resources (e.g., servers) to perform processing for the radio units based on a workload. Further, a virtualized RAN may implement multiple layers of RAN processing at data centers, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus, including: a memory storing computer-executable instructions; and a processor configured to execute the instructions to: receive measurements of a signal quality for a plurality of user devices connected to a radio access network (RAN); estimate a deliverable throughput of a wireless link for a user device of the plurality of user devices based on at least the measurements; and provide the deliverable throughput to an application server for an application of the user device communicating with the application server via the RAN.

In some aspects, the techniques described herein relate to an apparatus, wherein the deliverable throughput is also based on one or more of: a number of competing users, queue sizes of the user device and of the competing users, or a scheduling policy.

In some aspects, the techniques described herein relate to an apparatus, wherein the processor is configured to receive a query from the application server via an application programming interface (API), wherein providing the deliverable throughput is in response to the query.

In some aspects, the techniques described herein relate to an apparatus, wherein the deliverable throughput is an instantaneous capacity provided at a granularity requested via the API.

In some aspects, the techniques described herein relate to an apparatus, wherein the deliverable throughput is a forecasted capacity for a future time period requested via the API.

In some aspects, the techniques described herein relate to an apparatus, wherein to estimate the deliverable throughput, the at least one processor is configured to applying the measurements to a deep neural network (DNN) to predict an available bandwidth for the user device.

In some aspects, the techniques described herein relate to an apparatus, wherein the measurements include a classification of a signal to noise ratio (SNR) of the user device into one bucket of a plurality of buckets defined by ranges of SNR.

In some aspects, the techniques described herein relate to an apparatus, wherein the DNN includes a feature selection including a number of the plurality of user devices and a number of competing users in each of the plurality of buckets.

In some aspects, the techniques described herein relate to an apparatus, wherein the DNN returns a probability distribution for deliverable throughput of a cell.

In some aspects, the techniques described herein relate to a method including: receiving measurements of a signal quality for a plurality of user devices connected to a radio access network (RAN); estimate a deliverable throughput of a wireless link for a user device of the plurality of user devices based on at least the measurements; providing the deliverable throughput to an application server for an application of the user device communicating with the application server via the RAN.

In some aspects, the techniques described herein relate to a method, wherein estimating the deliverable throughput is based on one or more of: a number of competing users, queue sizes of the user device and of the competing users, a scheduling policy, and channel quality estimates for the user device and for the competing users.

In some aspects, the techniques described herein relate to a method, further including receiving a query from the application server via an application programming interface (API), wherein providing the deliverable throughput is in response to the query.

In some aspects, the techniques described herein relate to a method, wherein the deliverable throughput is an instantaneous capacity provided at a granularity requested via the API.

In some aspects, the techniques described herein relate to a method, wherein the deliverable throughput is a forecasted capacity for a future time period requested via the API.

In some aspects, the techniques described herein relate to a method, wherein estimating the deliverable throughput includes applying measurements of the user device and competing user devices to a deep neural network (DNN) to predict an available bandwidth for the user device.

In some aspects, the techniques described herein relate to a method, wherein the measurements of the user device include a classification of a signal to noise ratio (SNR) of the user device into one bucket of a plurality of buckets defined by ranges of SNR.

In some aspects, the techniques described herein relate to a method, wherein the DNN includes a feature selection including a number of the competing users and a number of competing users in each of the plurality of buckets.

In some aspects, the techniques described herein relate to a method, wherein the DNN returns a probability distribution for deliverable throughput for a cell.

In some aspects, the techniques described herein relate to a method for an application server, including: requesting, via an application programing interface (API) of a network entity of a radio access network, a deliverable throughput of a wireless link for a user device communicating with the application server; periodically receiving the deliverable throughput from the network entity; and selecting a data rate for the user device based on the deliverable throughput.

In some aspects, the techniques described herein relate to a method, wherein the deliverable throughput is an instantaneous capacity provided at a granularity requested via the API.

In some aspects, the techniques described herein relate to a method, wherein the deliverable throughput is a forecasted capacity for a future time period requested via the API.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
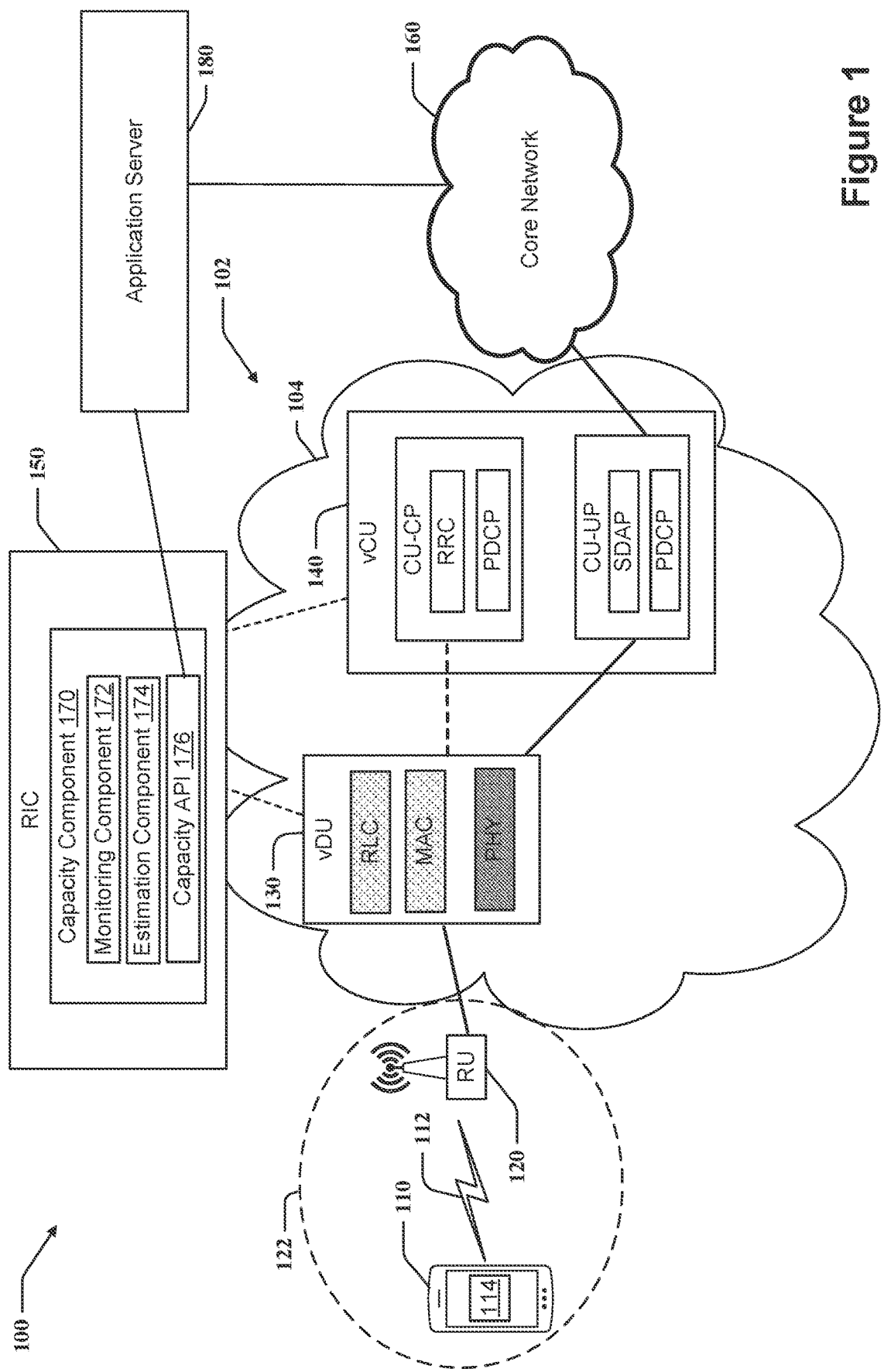
FIG. 1 is a diagram of an example mobile network including a radio access network (RAN) that connects a user equipment (UE) to a core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to calculating and exposing network capacity and congestion to applications. In a software radio access network (also referred to as a virtual RAN or vRAN), various base station components may be implemented in software executing on generic computing resources. For example, in a cloud network implementation, vRAN components may be executed as workloads on servers or datacenters.

A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

One such use case is providing network capacity information to applications. In a mobile network, the radio link between a user device and a base station may be a point with limited resources. For example, the radio link may rely on time domain and frequency domain resources that are allocated among multiple user devices communicating for various applications. Because the radio resources are limited, the radio link may become congested and be a bottleneck for communications of the applications. Some applications may have significant control over a data rate with a user device. For example, video streaming applications may adjust a resolution based on an expected throughput capacity of the connection with the user device. As another example, virtual reality or augmented reality applications may split rendering tasks between a server and user device. The server may perform more rendering tasks at the cost of a higher data rate to the user device.

While adaptive data rates may help an application react to changing network capacity, an application server often lacks accurate information about the capacity of a wireless link to a user device, which may be across several network hops. Some attempts to measure or predict radio link capacity have been implemented by applications at the user device. A user device may have information regarding channel conditions that can be used to estimate capacity. For example, a user device may measure channel quality (e.g., signal to noise ratio (SNR)) and physical (PHY) layer resource assignments for the user device. Some applications may attempt to detect physical layer resource assignments for other user devices based on a control channel. Such user device estimations suffer from several problems. First, the characteristics of an individual user device are just some of the factors used by the network to make scheduling decisions. A user device does not have access to information such as data queues of other users, channel quality estimates of other users, or a scheduling policy. Second, a user device providing capacity estimates may increase congestion on the wireless link due to additional allocation of uplink resources. For example, in a time division duplexing (TDD) configuration, additional uplink slots may be allocated for the user uplink data, which may further decrease capacity for the downlink data from the application.

In an aspect, the present disclosure provides for a network entity such as a virtual base station or a MC to provide capacity information to applications. For example, the MC may collect PHY layer user channel quality estimations from the virtual base stations via standardized O-RAN interfaces. The network entity may calculate an instantaneous capacity for a user device, an estimated capacity forecast, or both. The network entity may provide an application programming interface (API) that allows the application server to query the capacity information. For example, the API may allow the application server to configure periodic reports. In some implementations, the application server may adjust a data rate of the application based on the capacity information from the network entity.

Providing a capacity information such as a deliverable throughput from a network entity may improve the performance of applications communicating via the network. For example, Throughput capacity calculated at a network entity is more accurate and predictive than similar measures calculated at a user device or application server. The information from the network entity allows the application server to vary a data rate based on the capacity to optimize application quality (e.g., video resolution). Moreover, network measurements do not increase overhead as the user devices do not need to transmit additional measurements to the application server in the uplink. In some implementations, where a machine learning model is used to forecast estimated capacity based on network measurements and scheduling information, the estimated capacity may allow the application server to more efficiently set a data rate that is supported by the available capacity, thereby reducing congestion and retransmissions. That is, the communication link may operate more efficiently based on accurate capacity estimations.

Figure 3:
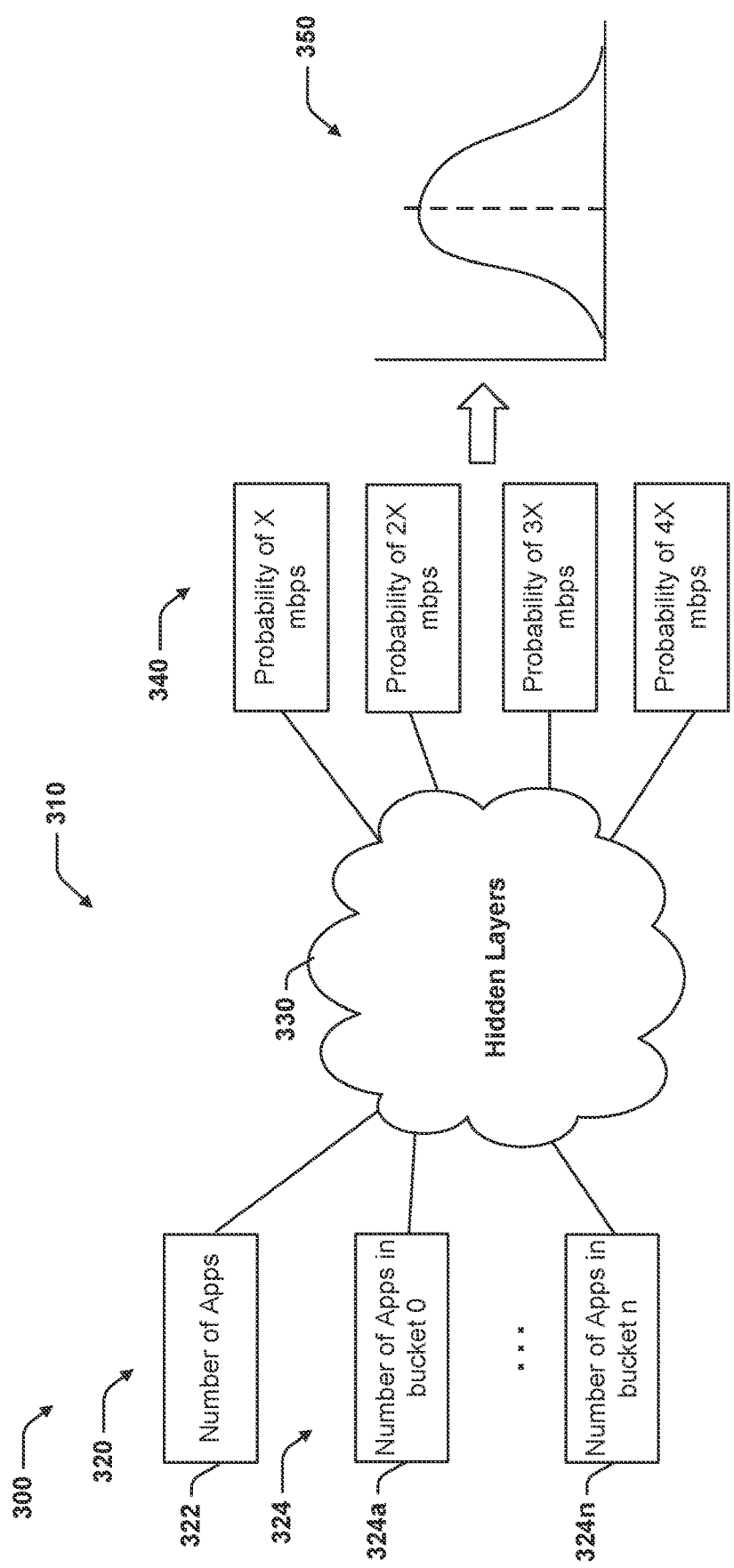
FIG. 3 is a diagram of an example bandwidth predictor that forecasts how much bandwidth capacity is likely to be available during a future time period.
Figure 4:
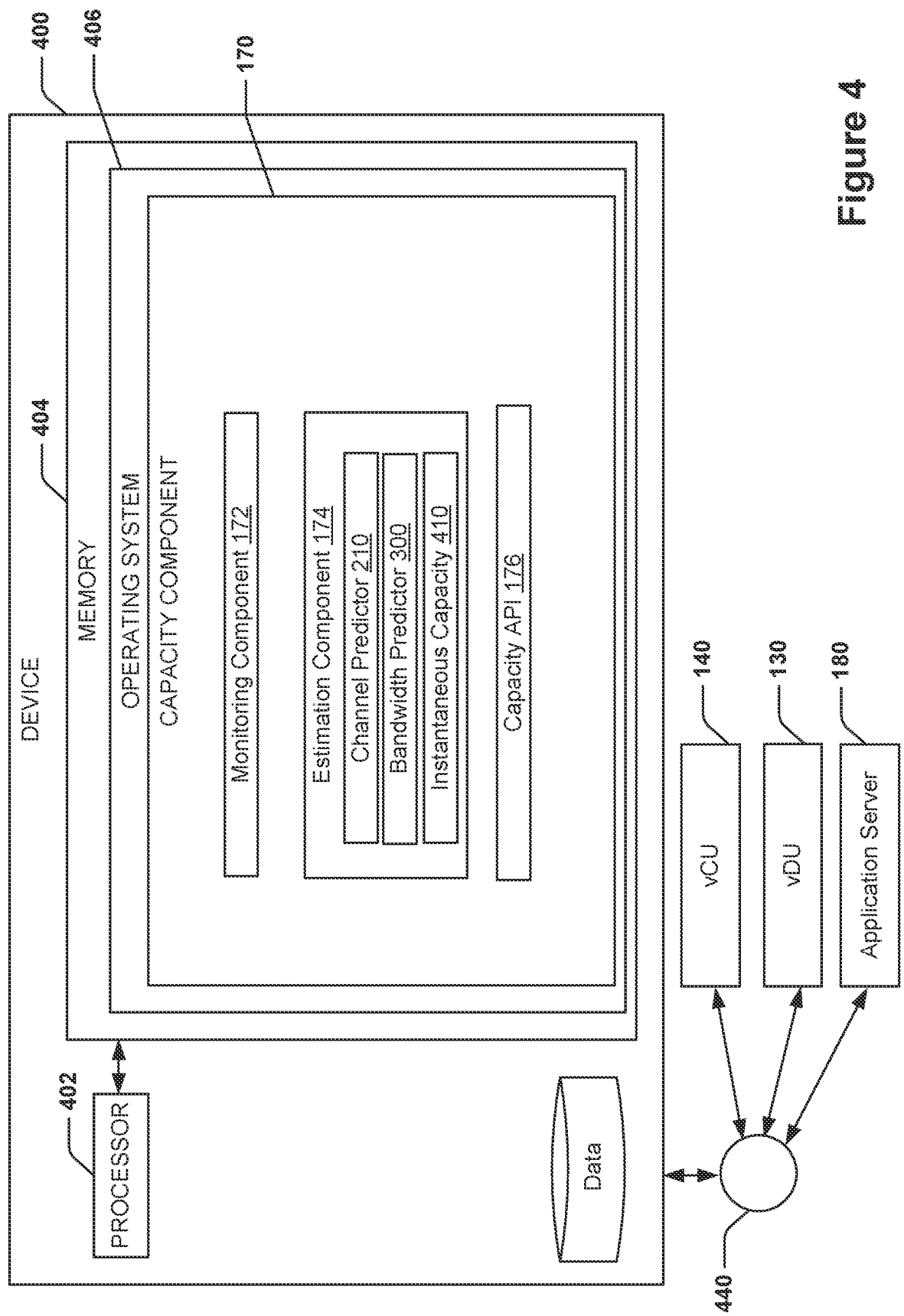
FIG. 4 is a schematic diagram of an example of an apparatus 400 (e.g., a computing device) for implementing a RAN intelligent controller (RIC) including a capacity component.
Figure 5:
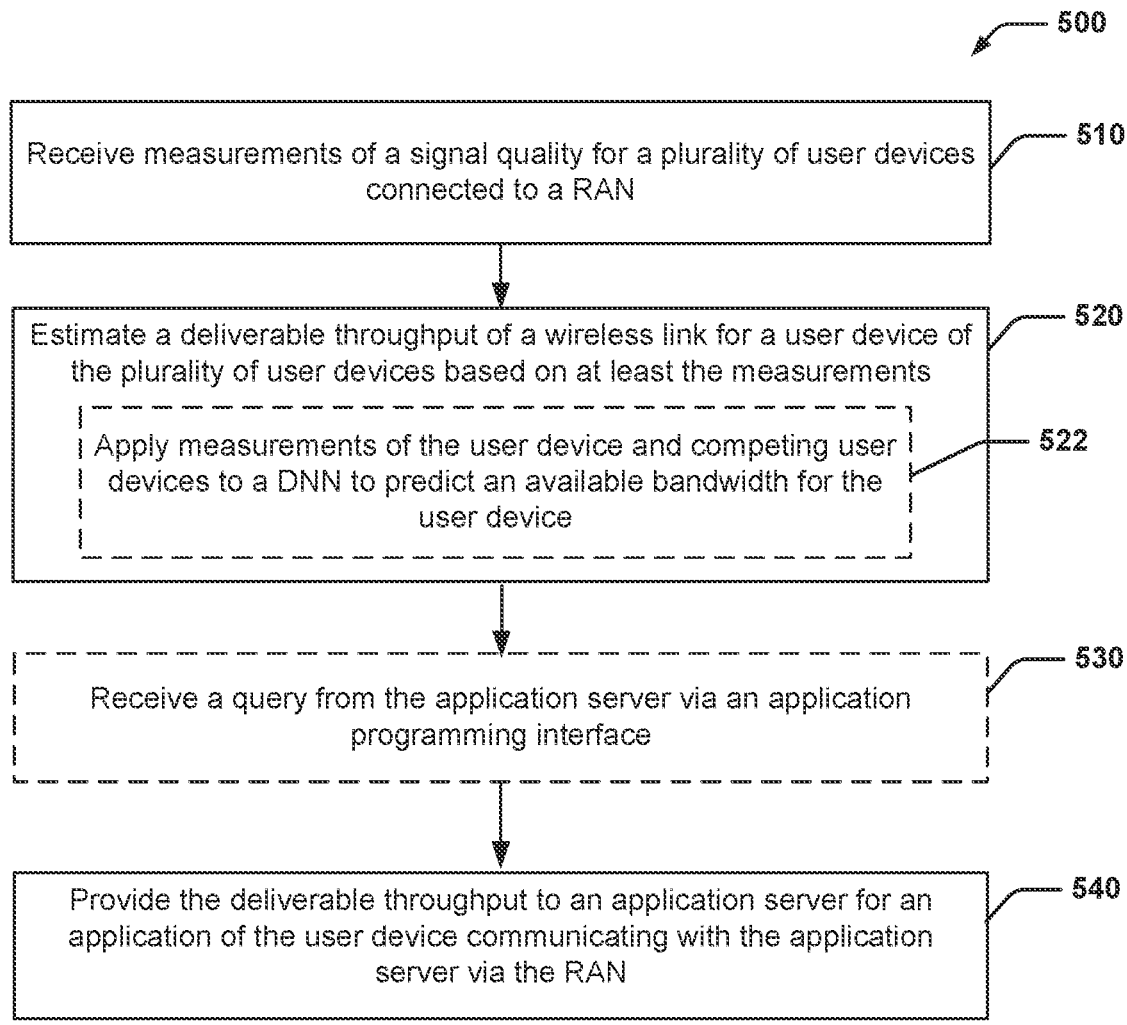
FIG. 5 is a flow diagram of an example of a method for providing deliverable throughput information to applications.
Figure 6:
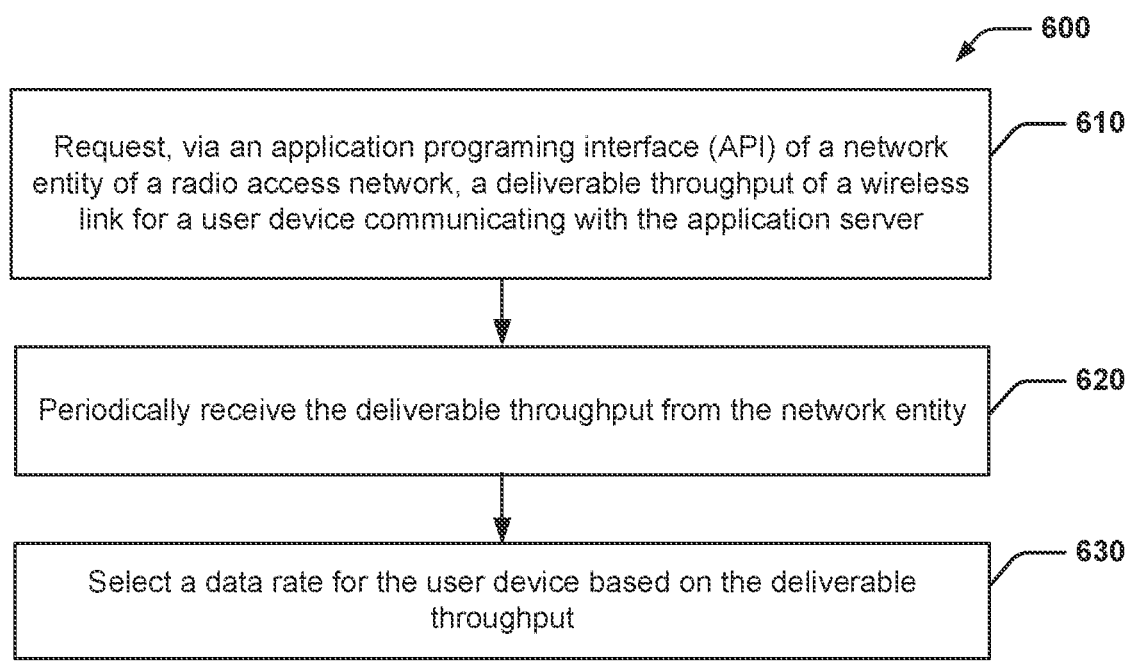
FIG. 6 is a flow diagram of an example of a method for obtaining capacity information at an application server.

Turning now to FIGS. 1-7, examples are depicted with reference to one or more components and one or more methods that may perform the actions or operations described herein, where components and/or actions/operations in dashed line may be optional. Although the operations described below in FIGS. 5 and 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example mobile network 100 including a radio access network (RAN) that connects a user device or user equipment (UE) 110 to a core network 160. The RAN may be implemented, at least in part, as a virtualized radio access network (vRAN) 102. The vRAN 102 may include radio units (RUs) 120 that transmit and receive wireless signals with the UEs 110 to establish a wireless link 112. Each RU 120 may provide a cell 122 having a coverage area that may overlap with other cells. Each RU 120 may include one or more antennas for transmitting and receiving radio frequency (RF) signals with the UEs 110 within the cell 122. The vRAN 102 provides connectivity between the UEs 110 and the core network 160. The core network 160 may forward user plane data packets (e.g., Internet protocol (IP) packets) between the vRAN 102 and application servers 180. For example, a UE 110 may include an application 114 that communicates with the application server 180 via the vRAN 102 and the core network 160.

The vRAN 102 may include virtual network components, which may be implemented on generic computing resources such as in a cloud network 104. The cloud network 104 may include an underlying wide area network (WAN) having computing resources such as servers or datacenters that may be used to instantiate software network functions. For example, the vRAN 102 may include one or more virtual distributed units (vDUs) 130 that perform processing for a cell 122, for example, at the physical (PHY) layer, media access control (MAC) layer, and radio link control (RLC) layer. The vRAN 102 may include one or more virtual central units (vCUs) 140 that perform processing at higher layers of the wireless protocol stack. In an example architecture, the vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer.

The division of functionality or protocol layers between the vDU 130 and the vCU 140 may depend on a functional split architecture. For example, as illustrated, the functional split may be between the RLC layer and the PDCP layer and may be referred to as option 2. Other options may include a functional split between the RRC layer and PDCP layer (option 1) or between or within the layers illustrated at the vDU 130. Accordingly, a vRAN 102 may allow network equipment vendors to offer network operators greater flexibility in where to locate computing resources for various protocol layers.

The vRAN 102 may include a RAN intelligent control (RIC) 150 that performs autonomous configuration and optimization of the vRAN 102. In some implementations, the MC 150 may allocate resources of the cloud network 104 for instantiating vRAN components such as vDU 130 and vCU 140. For example, the MC 150 may provide a configuration file for each vDU 130 or vCU 140. The MC 150 may assign network resources such as frequency sub-bands to cells. Further, the MC may monitor performance of the vRAN 102 and adapt the configuration. For example, the MC 150 may receive monitoring information such as performance metrics from the vRAN components such as the vDU 130 and vCU 140.

In an aspect, the MC 150 may include a capacity component 170 configured to provide capacity estimations to an application server 180. The capacity component 170 may include a monitoring component 172 configured to receive measurements of a signal quality for a plurality of user devices (e.g., UEs 110) connected to the vRAN 102. The capacity component 170 may include an estimation component 174 configured to estimate a throughput capacity of a wireless link 112 for a user device (e.g., UE 110) of the plurality of user devices based on at least the measurements.

The capacity component 170 may include a capacity API 176 configured to provide the throughput capacity to the application server 180 for an application 114 of the user device communicating with the application server 180 via the vRAN 102.

Figure 2:
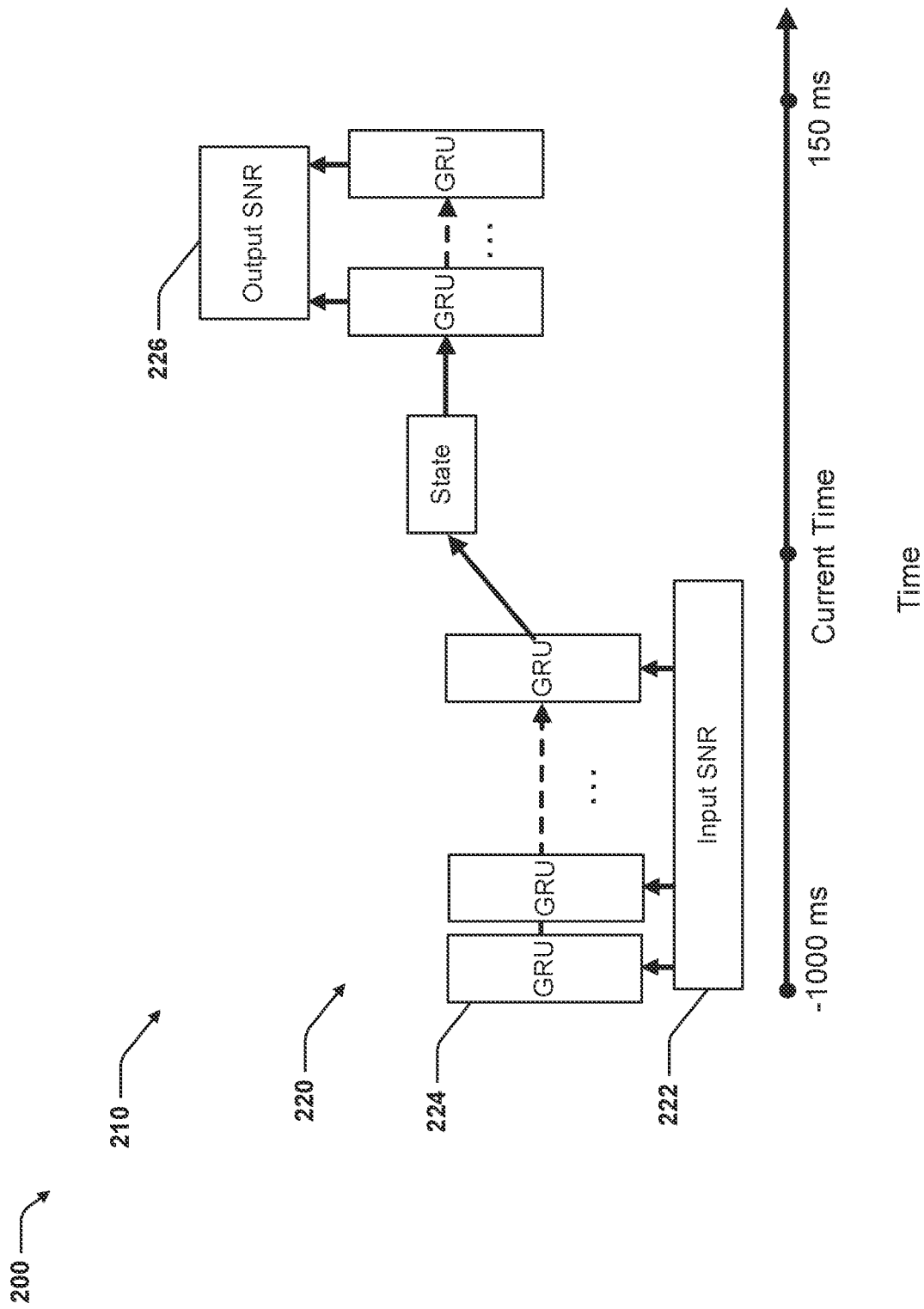
FIG. 2 is a diagram of an example channel predictor that forecasts how a wireless channel (for a user device will evolve over the near term.

FIG. 2 is a diagram 200 of an example channel predictor 210 that forecasts how a wireless channel (e.g., SNR) for a user device will evolve over the near term (e.g., 150 ms). Forecasting a wireless channel is a well-researched and fundamentally challenging problem. In an aspect, the capacity component 170 includes the channel predictor 210 that does not aim to perfectly predict SNR, but instead attempts to meet a desirable performance target. For example, an error of 2 dB may have a modest impact on bandwidth allocation. A media access control (MAC) scheduler may use an SNR forecast to determine what modulation and coding (MCS) scheme to assign to downlink transmissions. The 3GPP standards define 32 MCS values, and MAC schedulers use a lookup table to map measured channel quality to an MCS scheme. These tables may be quantized in 2 dB steps, so a prediction error of under 2 dB may still yield the correct MCS scheme.

In some implementations, the channel predictor 210 includes a sequence-to-sequence Recurrent Neural Network (RNN) 220, which uses an input sequence 222 of SNR measurements over the last 1 second to predict a sequence 226 of SNR measurements over the next 150 milliseconds. Each RNN cell is a Gated Recurrent Unit (GRU) 224, a lightweight mechanism that learns both short-term and long-term trends in a signal. The RNN 220 may be trained on a data set including SNR traces from a deployed network (e.g., a 5G cell). In some implementations, a simpler predictor that tracks the SNR with an exponentially-weighted moving average (EWMA) may also satisfy the 2 dB target.

FIG. 3 is a diagram of an example bandwidth predictor 300 that forecasts how much bandwidth capacity is likely to be available during a future time period. The bandwidth predictor 300 may utilize a deep neural network (DNN) 310 to predict capacity. For example, the bandwidth predictor 300 may output a probability distribution 350 of capacity for a cell with a bandwidth. In some implementations, network slicing may isolate applications with similar types of traffic. Estimation for a network slice allows a simple and tractable input embedding for a DNN because it may be assumed that all applications in a slice have similar service level agreements (SLAs). Moreover, slight variations in SLAs (e.g., a 4 Mbps video conference vs. a 5 Mbps video conference) should have negligible impact on performance. Second, in order to discretize the space of possible SNR values, the bandwidth predictor 300 may assign each application to an SNR bucket from an enumerated set (e.g., {poor, bad, good, great}), where each bucket corresponds to a range of SNR values (e.g., −5 dB≤bad<2 dB). To pick an SNR bucket for an incoming app, the bandwidth predictor 300 may first evaluate the application within a best effort slice for a brief period (e.g., 5 seconds) to gather some data (e.g., SNR). For existing apps within the slice, the historical data on the SNR may be applied to the channel predictor 210 to select a bucket. Accordingly, the measurements applied to the DNN 310 may include a classification of a SNR of the user device into one bucket of a plurality of buckets defined by ranges of SNR.

For each cell or slice at the cell, the bandwidth predictor 300 generates a feature selection 320 including a number of apps 322 in the cell or slice thereof and a number of apps in each SNR bucket 324 (e.g., 324a-324n). The DNN 310 includes hidden layers 330, which may include, for example, convolution layers and pooling layers. The output layer 340 may represent probabilities of available capacity (e.g., deliverable throughput) during a time period, which may be expressed as a probability of a data rate. The DNN 310 may output the cell or slice capacity as the deliverable throughput to an application as a probability distribution 350 for the cell or slice.

The DNN 310 may be trained separately for each slice based on simulated data with optimized bandwidth allocations. For example, the DNN 310 may be trained on all possible feature selections up to a maximum number of applications for a slice. In some implementations, the search space may be pruned based on simple heuristics, for example, when certain bucket distributions indicate little or no available capacity, a bucket distribution with more apps with lower SNR may also be labeled with no available capacity without simulating a bandwidth allocation.

FIG. 4 is a schematic diagram of an example of an apparatus 400 (e.g., a computing device) for implementing a RIC 150 including a capacity component 170. The apparatus 400 may be an example of a RIC 150. The apparatus 400 may reside within a data center, which may be an edge data center. The apparatus 400 may be connected to other servers within the data center or at other data centers via the switch 440. For example, apparatus 400 may be connected to a vCU 140, a vDU 130, and an application server 180.

In an example, apparatus 400 can include a processor 402 and/or memory 404 configured to execute or store instructions or other parameters related to providing an operating system 406, which can execute one or more applications or processes, such as, but not limited to, the capacity component 170. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the capacity component 170 may include one or more of the monitoring component 172, the estimation component 174, or the capacity API 176. In some implementations, the estimation component 174 may include the channel predictor 210, the bandwidth predictor 300, and/or an instantaneous capacity 410. The instantaneous capacity 410 may be based on a formula to calculate the capacity for a recent time period. For example, the capacity for the last slot may be a number of unassigned RBs times a number of bits per RB at a current MCS for the user device. In some implementations, a deliverable throughput may be calculated according to the following formula:

$$\text{Deliverable throughput} = c\_i(s\_i(q(u1), q(u2), \ldots, q(uN))),$$

where N is the number of user devices, u1-uN are the N users, q(uN) is the expected queue sizes for Nth user as a function of time, s_i (q1, . . . , qN) is the resource block allocation for the i^th users as a function of queue sizes and scheduling policy, and c_i is the throughput for the i^th user. C_i may be the instantaneous capacity determined based on RBs and MCS, which itself is a function of signal quality measurements. FIG. 5 is a flow diagram of an example of a method 500 for providing throughput capacity information to applications. For example, the method 500 can be performed by an apparatus 400 and/or one or more components thereof to provide a throughput capacity estimation to an application server 180.

At block 510, the method 500 includes receiving measurements of a signal quality for a plurality of user devices connected to a RAN. In an example, the monitoring component 172, e.g., in conjunction with processor 402, memory 404, and operating system 406, can receive measurements of a signal quality for a plurality of user devices 110 connected to a RAN 102. For example, the monitoring component 172 may be configured to receive SNR measurements from the vDUs 130. In some implementations, the monitoring component 172 may receive additional information from the vDUs 130 or vCUs 140 such as a number of competing users, queue sizes of the user device and of the competing users, a scheduling policy, and channel quality estimates for the user device and for the competing users. In some implementations, the RIC 150 may configure the vDUs 130 or vCUs 140 with relevant information such as the scheduling policy.

At block 520, the method 500 includes estimating a throughput capacity of a wireless link for a user device of the plurality of user devices based on at least the measurements. In an example, the estimation component 174, e.g., in conjunction with processor 402, memory 404, and operating system 406, can estimate a deliverable throughput of a wireless link 112 for a user device 110 of the plurality of user devices based on at least the measurements. For example, in some implementations, at sub-block 522, the block 520 may include applying measurements of the user device 110 and competing user devices to a DNN 310 to predict an available capacity for the user device. In some implementations, estimating the deliverable throughput may include calculating an instantaneous capacity.

At block 530, the method 500 may optionally include receiving a query from the application server via an application programming interface. In an example, the capacity API 176, e.g., in conjunction with processor 402, memory 404, and operating system 406, can receive the query from the application server 180. The query may request a certain type of estimated capacity such as instantaneous capacity or forecasted capacity. The query may specify a granularity for providing the estimated capacity such as a periodicity of reports. For forecasted capacity, the query may specify the time period of the forecast.

At block 540, the method 500 includes providing the deliverable throughput to an application server for an application of the user device communicating with the application server via the RAN. In an example, the capacity API 176, e.g., in conjunction with processor 402, memory 404, and operating system 406, can provide the deliverable throughput to an application server 180 for an application 114 of the user device 110 communicating with the application server via the RAN 102. In some implementations, providing the deliverable throughput in block 540 is in response to the query in optional block 530.

FIG. 6 is a flow diagram of an example of a method 600 for obtaining capacity information at an application server. For example, the method 600 can be performed by an application server 180 and/or one or more components thereof to set a data rate of an application 114 based on capacity information.

At block 610, the method 600 includes requesting, via an API of a network entity of a RAN, a deliverable throughput of a wireless link for a user device communicating with the application server. In an example, the application server 180 can request, via an API of a network entity (e.g., RIC 150) of a RAN 102, a deliverable throughput of a wireless link 112 for a user device 110 communicating with the application server.

At block 620, the method 600 includes periodically receiving the deliverable throughput from the network entity. In an example, the application server 180 can receive the deliverable throughput from the network entity (e.g., RIC 150). For example, the application server 180 may receive the deliverable throughput via the capacity API 176. In some implementations, receiving the deliverable throughput may be in response to a query submitted via the capacity API 176.

At block 630, the method 600 includes selecting a data rate for the user device based on the deliverable throughput. In an example, the application server 180 can select a data rate for the user device (e.g., for application 114) based on the deliverable throughput.

Figure 7:
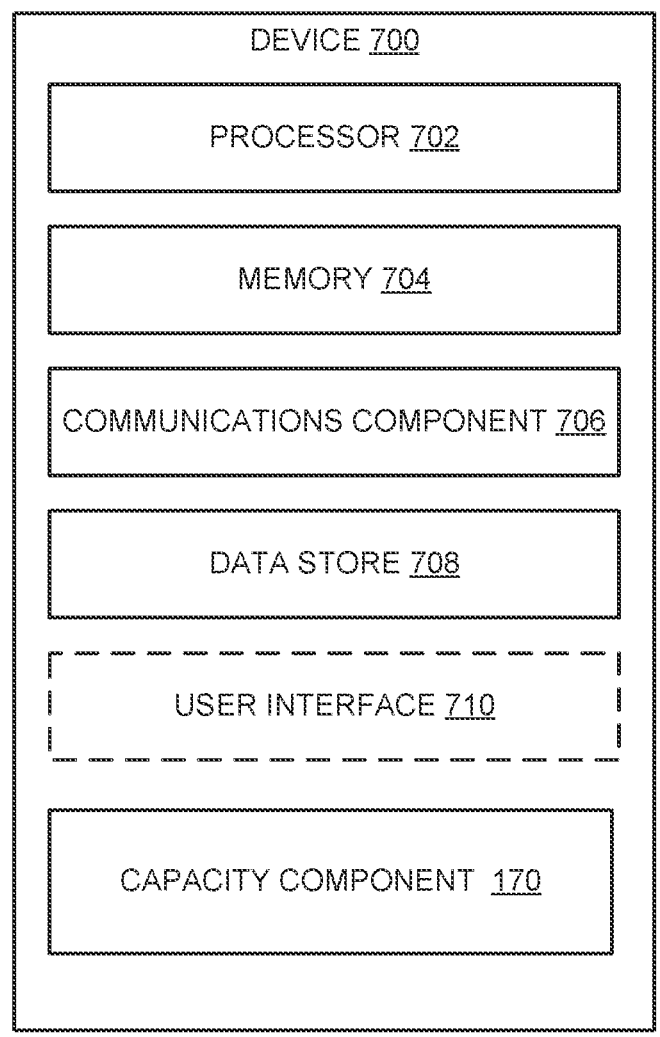
FIG. 7 illustrates an example of a device including additional optional component details as those shown in FIG. 5.

FIG. 7 illustrates an example of a device 700 including additional optional component details as those shown in FIG. 5. In one aspect, device 700 may include processor 702, which may be similar to processor 502 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 404 such as for storing local versions of operating systems (or components thereof) and/or applications being executed by processor 702, such as capacity component 170, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for capacity component 170, and/or one or more other components of the device 700.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include the capacity component 170 for calculating and exposing a network capacity to applications, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising:
a memory storing computer-executable instructions; and
at least one processor configured to execute the instructions to:
receive measurements of a signal quality for a plurality of user devices connected to a radio access network (RAN);
estimate a deliverable throughput of a wireless link for a user device of the plurality of user devices based on at least the measurements, wherein to estimate the deliverable throughput, the at least one processor is configured to apply the measurements to a deep neural network (DNN) to predict an available bandwidth for the user device, wherein the measurements include a classification of a signal to noise ratio (SNR) of the user device into one bucket of a plurality of buckets defined by ranges of SNR; and
provide the deliverable throughput to an application server for an application of the user device communicating with the application server via the RAN.

2. The apparatus of claim 1, wherein the deliverable throughput is also based on one or more of: a number of competing users, queue sizes of the user device and of the competing users, or a scheduling policy.

3. The apparatus of claim 1, wherein the processor is configured to receive a query from the application server via an application programming interface (API), wherein providing the deliverable throughput is in response to the query.

4. The apparatus of claim 3, wherein the deliverable throughput is an instantaneous capacity provided at a granularity requested via the API.

5. The apparatus of claim 3, wherein the deliverable throughput is a forecasted capacity for a future time period requested via the API.

6. The apparatus of claim 1, wherein the DNN includes a feature selection including a number of the plurality of user devices and a number of competing users in each of the plurality of buckets.

7. The apparatus of claim 6, wherein the DNN returns a probability distribution for deliverable throughput of a cell.

8. A method comprising:
receiving measurements of a signal quality for a plurality of user devices connected to a radio access network (RAN);
estimating a deliverable throughput of a wireless link for a user device of the plurality of user devices based on at least the measurements, wherein estimating the deliverable throughput comprises applying measurements of the user device and competing user devices to a deep neural network (DNN) to predict an available bandwidth for the user device, wherein the measurements of the user device include a classification of a signal to noise ratio (SNR) of the user device into one bucket of a plurality of buckets defined by ranges of SNR; and providing the deliverable throughput to an application server for an application of the user device communicating with the application server via the RAN.

9. The method of claim 8, wherein estimating the deliverable throughput is based on one or more of: a number of competing users, queue sizes of the user device and of the competing users, a scheduling policy, and channel quality estimates for the user device and for the competing users.

10. The method of claim 8, further comprising receiving a query from the application server via an application programming interface (API), wherein providing the deliverable throughput is in response to the query.

11. The method of claim 10, wherein the deliverable throughput is an instantaneous capacity provided at a granularity requested via the API.

12. The method of claim 10, wherein the deliverable throughput is a forecasted capacity for a future time period requested via the API.

13. The method of claim 8, wherein the DNN includes a feature selection including a number of the competing users and a number of competing users in each of the plurality of buckets.

14. The method of claim 13, wherein the DNN returns a probability distribution for deliverable throughput for a cell.

15. A method for an application server, comprising:
requesting, via an application programing interface (API) of a network entity of a radio access network, a deliverable throughput of a wireless link for a user device communicating with the application server;
periodically receiving the deliverable throughput from the network entity, wherein the deliverable throughput is based on a deep neural network (DNN) that receives measurements of the user device and competing user devices to predict an available bandwidth for the user device, wherein the measurements of the user device include a classification of a signal to noise ratio (SNR) of the user device into one bucket of a plurality of buckets defined by ranges of SNR; and
selecting a data rate for the user device based on the deliverable throughput.

16. The method of claim 15, wherein the deliverable throughput is an instantaneous capacity provided at a granularity requested via the API.

17. The method of claim 15, wherein the deliverable throughput is a forecasted capacity for a future time period requested via the API.

\* \* \* \* \*